United States Patent
Lennevi

(10) Patent No.: US 9,656,568 B2
(45) Date of Patent: May 23, 2017

(54) METHOD AND ARRANGEMENT FOR ERROR DETECTION DURING CHARGING OF AN ENERGY STORAGE SYSTEM

(71) Applicant: VOLVO TRUCK CORPORATION, Göteborg (SE)

(72) Inventor: Jerker Lennevi, Lerum (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/784,393

(22) PCT Filed: Apr. 15, 2013

(86) PCT No.: PCT/EP2013/001093
§ 371 (c)(1),
(2) Date: Oct. 14, 2015

(87) PCT Pub. No.: WO2014/169927
PCT Pub. Date: Oct. 23, 2014

(65) Prior Publication Data
US 2016/0075250 A1    Mar. 17, 2016

(51) Int. Cl.
*B60L 11/18*    (2006.01)
*B60L 3/00*    (2006.01)
(Continued)

(52) U.S. Cl.
CPC ......... *B60L 11/1848* (2013.01); *B60L 3/0023* (2013.01); *B60L 3/04* (2013.01);
(Continued)

(58) Field of Classification Search
CPC .............. B60L 11/1848; B60L 11/1838; B60L 11/1851; B60L 3/0023; B60L 3/04;
(Continued)

(56) References Cited

U.S. PATENT DOCUMENTS

| 5,311,973 A * | 5/1994 | Tseng .................... B60L 11/182 191/10 |
| 2008/0094034 A1* | 4/2008 | Takahashi ............. B60L 11/185 320/134 |

(Continued)

FOREIGN PATENT DOCUMENTS

| CN | 101170202 A | 4/2008 |
| CN | 101902063 A | 12/2010 |

(Continued)

OTHER PUBLICATIONS

International Search Report (Jan. 22, 2014) for correspondintg International App. PCT/EP2013/001093.
(Continued)

*Primary Examiner* — Calvin Cheung
(74) *Attorney, Agent, or Firm* — WRB-IP LLP

(57) ABSTRACT

A method for error detection during charging of an energy storage system in a vehicle is provided, the vehicle including an electric machine which is arranged for propulsion of the vehicle. The method includes requesting a charging pattern from an external power supply, by a vehicle control unit, upon connection of the energy storage system to the external power supply; and supplying the charging pattern to the energy storage system by an external charging control unit forming part of the external power supply. The method furthermore includes providing a predetermined modulation of the requested charging pattern; evaluating whether the charging pattern supplied to the energy storage system includes the predetermined modulation; and, if this is not the case, indicating that the charging of the energy storage system is erroneous. An arrangement for error detection during charging of an energy storage system, and a vehicle including an electric machine and having such an arrangement are also provided.

20 Claims, 3 Drawing Sheets

(51) Int. Cl.
*B60L 3/04* (2006.01)
*B60L 3/12* (2006.01)
*B60L 11/14* (2006.01)
*H02J 7/00* (2006.01)

(52) U.S. Cl.
CPC ............... *B60L 3/12* (2013.01); *B60L 11/14* (2013.01); *B60L 11/182* (2013.01); *B60L 11/1816* (2013.01); *B60L 11/1838* (2013.01); *B60L 11/1851* (2013.01); *B60L 11/1877* (2013.01); *H02J 7/0047* (2013.01); *H02J 7/0052* (2013.01); *B60L 2200/18* (2013.01); *B60L 2200/36* (2013.01); *B60L 2250/10* (2013.01); *B60L 2250/16* (2013.01); *Y02T 10/70* (2013.01); *Y02T 10/7005* (2013.01); *Y02T 10/705* (2013.01); *Y02T 10/7072* (2013.01); *Y02T 10/7077* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y10S 903/907* (2013.01)

(58) Field of Classification Search
CPC ......... B60L 3/12; H02J 7/0052; H02J 7/0047; Y10S 903/907
See application file for complete search history.

(56) References Cited

U.S. PATENT DOCUMENTS

| | | | |
|---|---|---|---|
| 2009/0108803 A1* | 4/2009 | Singarajan | B60L 11/1868 320/105 |
| 2009/0195237 A1 | 8/2009 | Feuss et al. | |
| 2010/0273072 A1* | 10/2010 | Hasegawa | B60L 3/0023 429/431 |
| 2010/0301810 A1* | 12/2010 | Biondo | H04Q 9/00 320/155 |
| 2011/0196545 A1 | 8/2011 | Miwa | |
| 2011/0241913 A1* | 10/2011 | Ikeda | H03M 1/12 341/118 |
| 2012/0139650 A1* | 6/2012 | Tsai | H03D 13/00 331/1 R |
| 2012/0161925 A1 | 6/2012 | Gale et al. | |
| 2012/0173066 A1* | 7/2012 | Yamada | B60L 11/1803 701/22 |
| 2013/0124117 A1* | 5/2013 | Nomura | B60L 11/1868 702/58 |
| 2015/0270727 A1* | 9/2015 | Fukute | G01R 31/3658 320/107 |

FOREIGN PATENT DOCUMENTS

| | | |
|---|---|---|
| CN | 102265579 A | 11/2011 |
| DE | 20 2011 004515 U1 | 10/2011 |
| EP | 2 383 858 A1 | 11/2011 |
| JP | H06245325 | 9/1994 |
| JP | 2008206259 | 4/2006 |
| JP | 2012249409 | 12/2012 |
| WO | 2012132405 A1 | 10/2012 |

OTHER PUBLICATIONS

International Preliminary Report on Patentability (Mar. 31, 2015) for corresponding International App. PCT/EP2013/001093.
Chinese Official Action (Dec. 30, 2016) for corresponding Chinese App. 201380075664.8.
Japanese Offical Action (Mar. 30, 2017) (translations) from corresponding Japanese App. 2016-508016.

* cited by examiner

METHOD AND ARRANGEMENT FOR ERROR DETECTION DURING CHARGING OF AN ENERGY STORAGE SYSTEM

BACKGROUND AND SUMMARY

The present invention relates to a method for error detection during charging of an energy storage system in a vehicle, said vehicle comprising an electric machine which is arranged for propulsion of said vehicle, said method comprising: requesting a charging pattern from an external power supply by means of a vehicle control unit, upon connection of said energy storage system to said external power supply; and supplying said charging pattern to said energy storage system by means of an external charging control unit forming part of said external power supply.

The invention also relates to an arrangement for error detection during charging of an energy storage system in a vehicle with an electric machine arranged for propulsion of said vehicle, said arrangement further comprising a vehicle control unit arranged for requesting as charging pattern from an external power supply upon connection of said energy storage system to said external power supply; and wherein the external power supply comprises an external charging control unit arranged for supplying said charging pattern to said energy storage system.

In the field of vehicles, there is a steady increase in research and development related to propulsion of vehicles with alternative power sources, i.e. power sources being used as alternatives to conventional internal combustion engines.

An internal combustion engine, for example in the form of a gasoline engine or a diesel engine, offers high efficiency with relatively low fuel consumption. However, environmental concerns have led to an increase in development of more environmental-friendly power sources for vehicles. In particular, the development of electrically operated vehicles has emerged as a promising alternative.

Today, there exist various types of vehicle propulsion systems comprising electric machines. For example, a vehicle can be operated by means of an electric machine solely, or by means of an arrangement comprising both an electric machine and an internal combustion engine. The latter alternative is often referred to as a hybrid electric vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as carbon monoxide and oxides of nitrogen.

The technology involved in electrically operated vehicles is closely related to the development of electrical energy storage systems, for example in the form of battery-related technology for vehicles. Today's electrical energy storage systems for vehicles may comprise a set of rechargeable battery cells which, together with control circuits, forms a unit which is arranged in a vehicle and which is configured for operating an electric machine. A hybrid vehicle is also often arranged so that the energy storage system is charged during braking, by means of a process known as regenerative braking.

A vehicle being operated by means of an internal combustion engine and an electric machine supplied with power from a rechargeable electrical energy storage system is sometimes referred to as a plug-in hybrid electric vehicle (PHEV). A plug-in hybrid electric vehicle uses an energy storage system with rechargeable batteries or another suitable energy source which can be restored into a condition involving a full charge through a connection to an external electric power supply.

The external power supply can be in the form of the common electric grid power system which can be accessed via a conventional power cord, or can be in the form of other arrangements depending on the vehicles involved and the power need for the recharging process. In case of vehicles in the form of buses or heavy transport vehicles, more powerful charging devices and procedures are normally needed as compared with smaller cars and similar vehicles.

A challenge for today's electrically driven vehicles, in particular heavy vehicles such as buses and trucks, is that a high amount of energy must be charged into the energy storage system in a relatively short time in order to optimize the vehicle's range of driving. For this reason, the actual charging of the energy storage system is suitably implemented through a process in which a control unit on the vehicle requests a charging to be carried out by means of an external electric power supply. This is carried out after the energy storage system and the external power supply have been electrically connected by means of suitable connector elements. In such cases, a so-called pantograph can for example be used to connect the onboard energy storage system with an external power supply.

The recharging of an energy storage system in a bus, for example, may involve charging an electrical energy storage system comprising a number of battery cells with a charging current which is of the magnitude 200 A, whereas the electrical energy storage system may have a voltage of the magnitude of 600 V. Such a charging procedure involves certain safety risks, for example if the battery cells are exposed to excessive heat, impact or overcharging, or if electrically conducting parts of the energy storage system or charging system come into contact with persons. Consequently, there are demands for protection of persons in the event of any error which may occur during charging.

Also, the battery cells of the energy storage system are both very expensive and also very sensitive to overcharging. This also means that overcharging of the energy storage system must not occur.

The patent document US 2011/196545 teaches a charging system for a hybrid vehicle in which a power storage device is charged by means of a power supply. If the vehicle in question should move during charging, a control unit stops the charging process. Said control unit then diagnoses a state of the charging unit and resumes the charging when this is possible.

Even though the above-mentioned solution according to US 2011/196545 offers a reliable solution for terminating the charging process if the vehicle should move, there are still further demands for a sufficiently high level of safety for persons and for electric equipment during charging of an energy storage system, in particular in hybrid vehicles.

It is desirable to provide an improved method and arrangement by means of which the above-mentioned problems can be overcome and, in particular, by means of which any errors occurring during charging of an energy storage system in a vehicle can be detected in an effective and secure manner. Such detection can then be used for discontinuing the charging process or for issuing an alarm signal.

In accordance with an aspect of the invention, a method is provided for error detection during charging of an energy storage system in a vehicle, said vehicle comprising an electric machine which is arranged for propulsion of said vehicle. The method comprises requesting a charging pattern from an external power supply, by means of a vehicle control unit, upon connection of said energy storage system to said external power supply, and supplying said charging pattern to said energy storage system by means of an external charging control unit forming part of said external power supply. Furthermore, said method comprises: providing a predetermined modulation of the requested charging pattern; evaluating whether the charging pattern supplied to said energy storage system comprises said predetermined modulation; and, if this is not the case, indicating that the charging of said energy storage system is erroneous.

By means of the invention, there is provided a safe and reliable method for determining whether any unexpected error in the charging of the energy storage system occurs, and for terminating the charging and issuing at alarm in the event such an error occurs.

A particular advantage of the invention is that the request for the charging pattern can be transmitted through a transmission path from the vehicle to the external power supply, after which the vehicle control unit may determine, during said evaluation step, whether the charging pattern which is actually received by the vehicles energy storage system also corresponds to the requested charging pattern.

According to an embodiment, the modulation is provided for example in the form of a predetermined, temporary change of frequency, amplitude or wave shape of a charging current which is supplied through said charging pattern. This means that the control unit of the vehicle may detect whether this temporary change of for example frequency or amplitude also occurs in the actual charging current. If this is the case, the charging is operating correctly.

Alternatively, the above-mentioned modulation can be provided in the form of an added signal component which is temporarily superimposed to a charging current which is supplied through said charging pattern.

According to an embodiment, an alarm signal is issued in the event that the charging is erroneous. This means that an operator or a driver of the vehicle may activate an emergency switch in the external power supply so as to prevent the energy storage system from being damaged or to prevent any personal injuries. Also, the energy storage system can be disconnected from the external power supply in an automatic manner in case the charging is erroneous. Such disconnection can be made automatically by means of a disconnector unit associated with the vehicles control unit.

According to an embodiment, the information between the control unit on the vehicle and the external power source can be provided on a wireless connection between said hybrid control unit and said external charger control unit.

According to another aspect of the invention, an arrangement is provided for error detection during charging of an energy storage system in a vehicle with an electric machine arranged for propulsion of said vehicle, said arrangement further comprising as vehicle control unit arranged for requesting a charging pattern from an external power supply upon connection of said energy storage system to said external power supply; and wherein the external power supply comprises an external charging control unit arranged for supplying said charging pattern to said energy storage system. According to the invention, the hybrid control unit comprises a modulation unit for applying a predetermined modulation of said requested charging pattern and an evaluation unit for determining whether the charging pattern supplied to said energy storage system comprises predetermined modulation; and, if this is not the case, indicating that said charging of said energy storage system is erroneous.

The invention is particularly adapted for being used in a so-called plug-in hybrid vehicle, having an internal combustion engine and an electric machine which are arranged for propulsion of said vehicle.

The term "charging pattern" refers to a predetermined schedule, sequence or progression of the recharging process. Such a charging pattern can for example be in the form of a "quick charge", i.e. involving a relatively high charging current during a relatively short time period, or a "standard charge", i.e. involving a lower charging current during a relatively long time period. A charging pattern of the "quick charge" type can for example be suitable for recharging the energy storage system of a bus while the bus is being parked briefly during a lunch break or between two consecutive rounds. Consequently, a "charging pattern" is a charging sequence with a certain charging current and voltage which occurs for a certain time or until a certain state of charge has been achieved by the energy storage system Furthermore, the term "modulation" refers to any predetermined variation, deviation or adaptation of the charging current or charging voltage which can be controlled by the vehicles control unit and requested to be supplied from the external power supply. Such a "modulated" charging pattern can subsequently be detected and evaluated by the vehicles control unit in order to determine whether the charging supplied by the external power supply corresponds to the requested charging. Any difference between the requested charging pattern and the supplied charging pattern can be interpreted as an error of the charging process.

BRIEF DESCRIPTION OF DRAWINGS

The invention will now be described with reference to an embodiment and with reference to the appended drawings, wherein.

DETAILED DESCRIPTION

Figure 1:
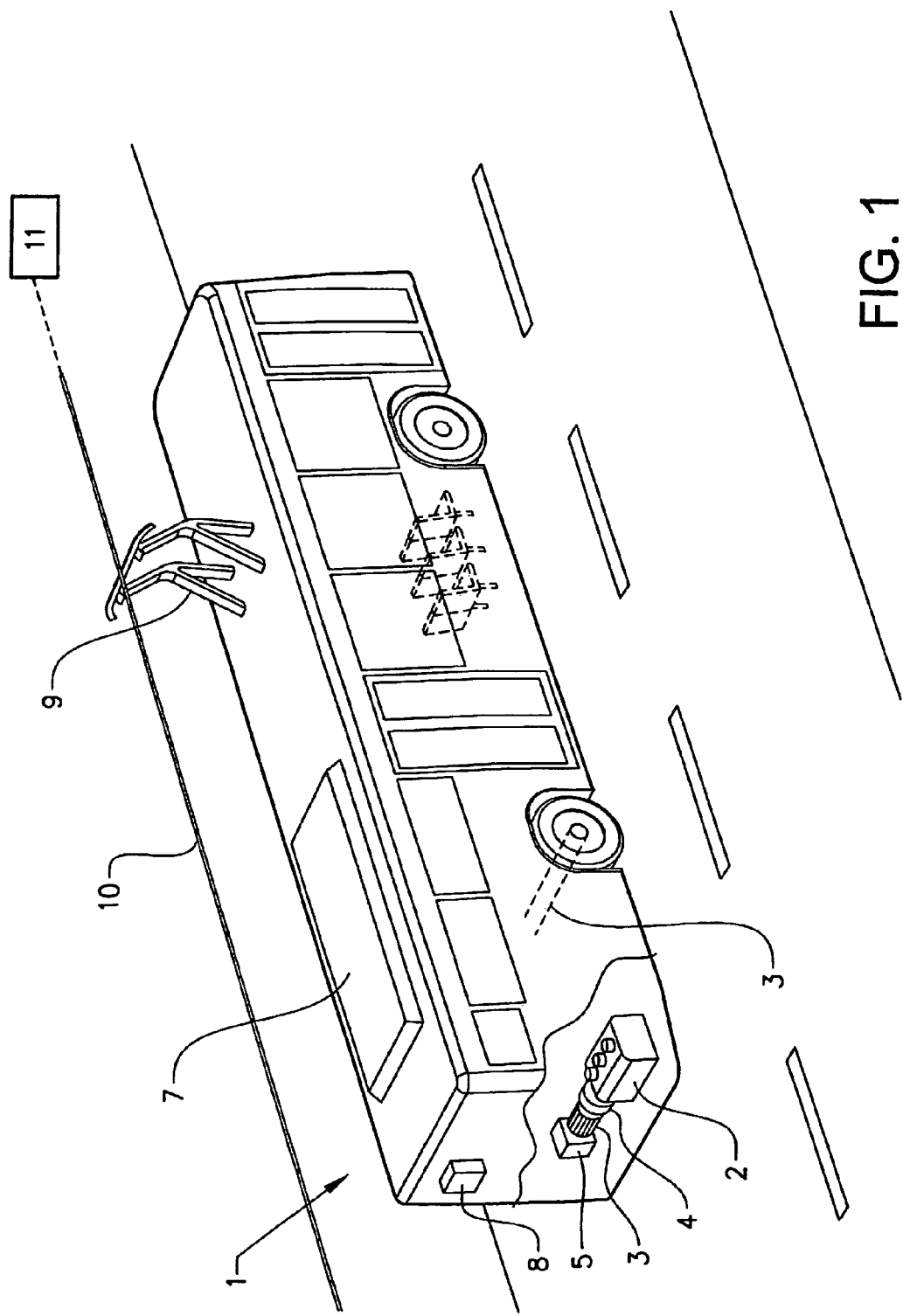
FIG. 1 shows a schematical view of a hybrid vehicle in the form of a bus, in which the present invention can be used.

The invention will now be described with reference to an embodiment and the enclosed drawings. With reference initially to FIG. 1, there is shown a simplified perspective view of a vehicle in the form of a bus 1 which according to an embodiment is of hybrid type. More precisely, the bus 1 is of the plug-in hybrid type which is equipped with an internal combustion engine 2 and an electric machine 3 which are connected to each other via a clutch 4 and wherein both the internal combustion engine 1 and the electrical machine 2 can be used to drive the bus 1.

Even though the invention is described with reference to a vehicle in the form of a bus, it can be used for virtually any type of vehicle which is operated by means of at least an electric machine.

With reference to FIG. 1, the electric machine 3 is connected to a gearbox 5, which in turn is connected to a rear axle 6 of the bus 1. In a manner which is known as such, the internal combustion engine 2 and the electric machine 3 can be used for driving the rear axle 6. The electric machine 3 is according to the embodiment used as a combined electric drive motor and generator, and is suitably also used as a starter motor for the internal combustion engine 2.

The bus 1 carries an electric energy storage system 7 which comprises a set of battery cells and other control circuits. Due to its size and width, it is suitable to arrange the energy storage system 7, for example, on the roof of the bus 1, as indicated in FIG. 1. The energy storage system 7 comprises a number of battery cells which are connected in series to provide an output DC voltage having a desired voltage level. Suitably, the battery cells are of lithium-ion type but other types may also be used. The energy storage system 7 also comprises control circuits adapted for monitoring the operation of the battery cells.

The various above-mentioned components of the propulsion system of the bus 1 are connected to a vehicle control unit 8, which will be described in greater detail below.

During certain modes of operation of the bus 1, it is suitable to use only the electric machine 3 for operating the bus 1. This means that the energy storage system 7 will deliver the required power to the electric machine 3, which in turn is driving the rear axle 6. During other modes of operation of the bus 1, for example when the state of charge of the energy storage system 7 is determined as not being sufficient for operating the bus 1 by means of the electric machine 3, the internal combustion engine 2 is connected, via the clutch 4 and the gearbox 5, to the rear axle 6. The manner in which an electric machine and an internal combustion engine can be used for operating a vehicle is generally previously known and for this reason, it is not described in any greater detail here.

Furthermore, the bus 1 is equipped with an electric connector element 9, suitably in the form of a pantograph which is mounted on the roof of the bus 1. The pantograph 9 is arranged for being connected to a further connector element 10 in the form of an overhead electrical conductor wire which conducts a charging current with a certain voltage.

A pantograph is an electrical connector device which can be positioned on the roof of a bus, a tramway car or similar, and which is adapted to be raised so as to assume an elevated condition in which it comes into contact with an electrically conducting wire or rail being positioned over the vehicle. In the context of the present invention, the energy storage system 7 can be supplied with an electrical current, by means of the connection between the overhead wire 10 and the pantograph 9, in order to charge the energy storage system 7.

According to the embodiment, the connector elements 9, 10 are arranged so that charging of the energy storage system 7 takes place while the bus 1 is standing still, i.e. either at a terminal facility or at a bus stop or a similar position. Furthermore, the conductive wire 10 forms part of an external power supply 11, as indicated, in a schematic manner in FIG. 1. The external power supply 11 is generally configured for feeding a certain charging current with a charging voltage to the conductive wire 10.

Figure 2:
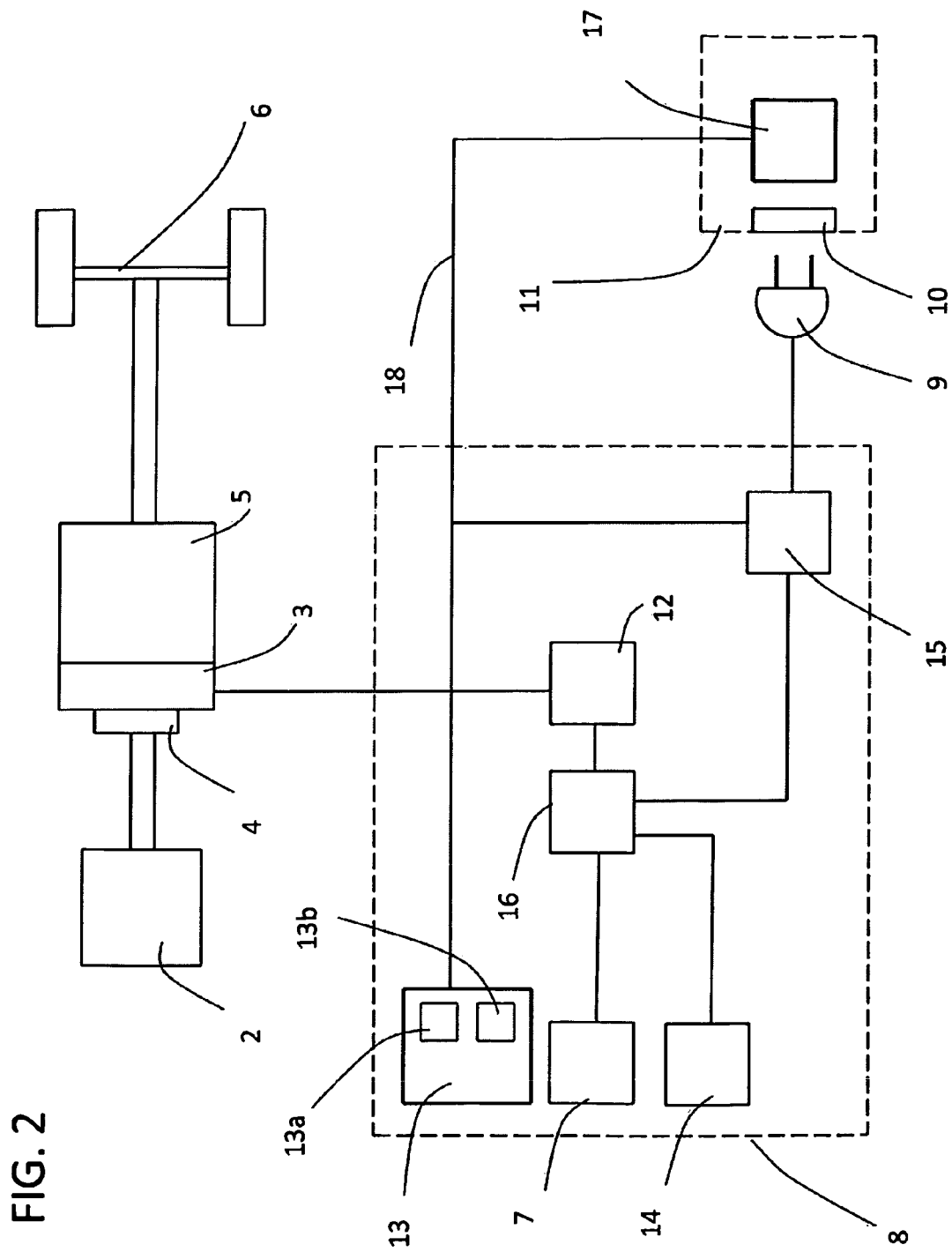
FIG. 2 is a diagram showing an arrangement in accordance with the invention.

FIG. 2 is a schematic diagram of the main components forming part of the invention. Components occurring both in FIG. 1 and FIG. 2 are indicated with the same reference numerals. Accordingly, the bus 1 is operated by means of an arrangement comprising an internal combustion engine 2 and an electric machine 3 which are connected via a gearbox 5 to the rear axle 6 of the bus 1. The electric machine 3 is arranged for being used as a starter motor, a generator or as an electric machine being provided with an operating voltage from the energy storage system 7.

The electric machine 3 is controlled by means of an electric motor drive unit 12, which forms part of the vehicle control unit 8 (cf. FIG. 1). The vehicle control unit 8 also comprises a hybrid control unit 13 which is arranged for controlling the charging procedure of the energy storage system 7, as will be described in greater detail below. Furthermore, the vehicle control unit 8 comprises a DC/DC-converter 14 which is configured for converting the direct current (DC) from the energy storage system 7 from one voltage level to another, for example from approximately 200 V of the energy storage system 7 to approximately 24 V which can be used for operating accessories such as lights and other electric devices in the vehicle.

The vehicle control unit 8 also comprises a disconnector unit 15 arranged to be able to disconnect the two connector elements 9, 10 from each other, if needed. Such a need may arise in the event that an error occurs during the charging, as will be described below.

In FIG. 2, the connector elements 9, 10 are schematically depicted in the form of a plug and a socket. However, as disclosed in connection with the embodiment shown in FIG. 1, the connector elements 9, 10 are suitably in the form of a pantograph 9 and a conductive wire 10. The two connector elements can alternatively be formed by other conductive elements or even inductive elements as an alternative to conductive elements in the form of a pantograph and conductive wire.

Furthermore, the vehicle control unit 8 comprises a junction box 16 to which the energy storage system 7, the hybrid control unit 13, the DC/DC converter 14, the electric motor drive unit 12 and the disconnector unit 15 are connected. Also, the external power supply 11 comprises a charger control unit 17 being arranged, for controlling the process of charging of the energy storage system, as will be described below.

During normal driving, the pantograph 9 is not connected to any external power supply. When recharging of the energy storage system 7 is required, the bus 1 is parked underneath the conductive wire 10 and the pantograph 9 is positioned so that it comes into contact with the conductive wire 10.

When the bus 1 is in a position in which the pantograph 9 is in contact with the conductive wire 10, the energy storage system 7 is consequently in contact with the external power supply 11. This means that the vehicle control unit 8 of the bus 1 may then request charging from the external power supply 11. This is obtained by means of transmitting data messages, on an information link 18, between the hybrid control unit 13 and the charger control unit 17. The information link 18 is preferably wireless and allows data to be transmitted between the hybrid control unit 13 and the charger control unit 17.

Generally, it can be said that the hybrid control unit 13 may request a particular charging pattern from said charging control unit 17. As mentioned above, the term "charging pattern" refers to a given charging sequence with a certain charging current and voltage, for a certain time or until a certain state of charge has be fulfilled by the energy storage system 7.

A process for charging the energy storage system 7 in accordance with the invention will now be described with reference to the flow chart of FIG. 3.

A first step by means of which the process is started is the connection of the connector elements 9, 10, as described above. In case the connector element 9 of the bus is a pantograph and the connector element 10 of the external power source is an overhead conductive wire, this first step (see reference numeral 19 in FIG. 3) corresponds to a situation in which the pantograph 9 is in a raised condition in which it is in electrically conductive contact with the overhead conductive wire 10.

Figure 3:
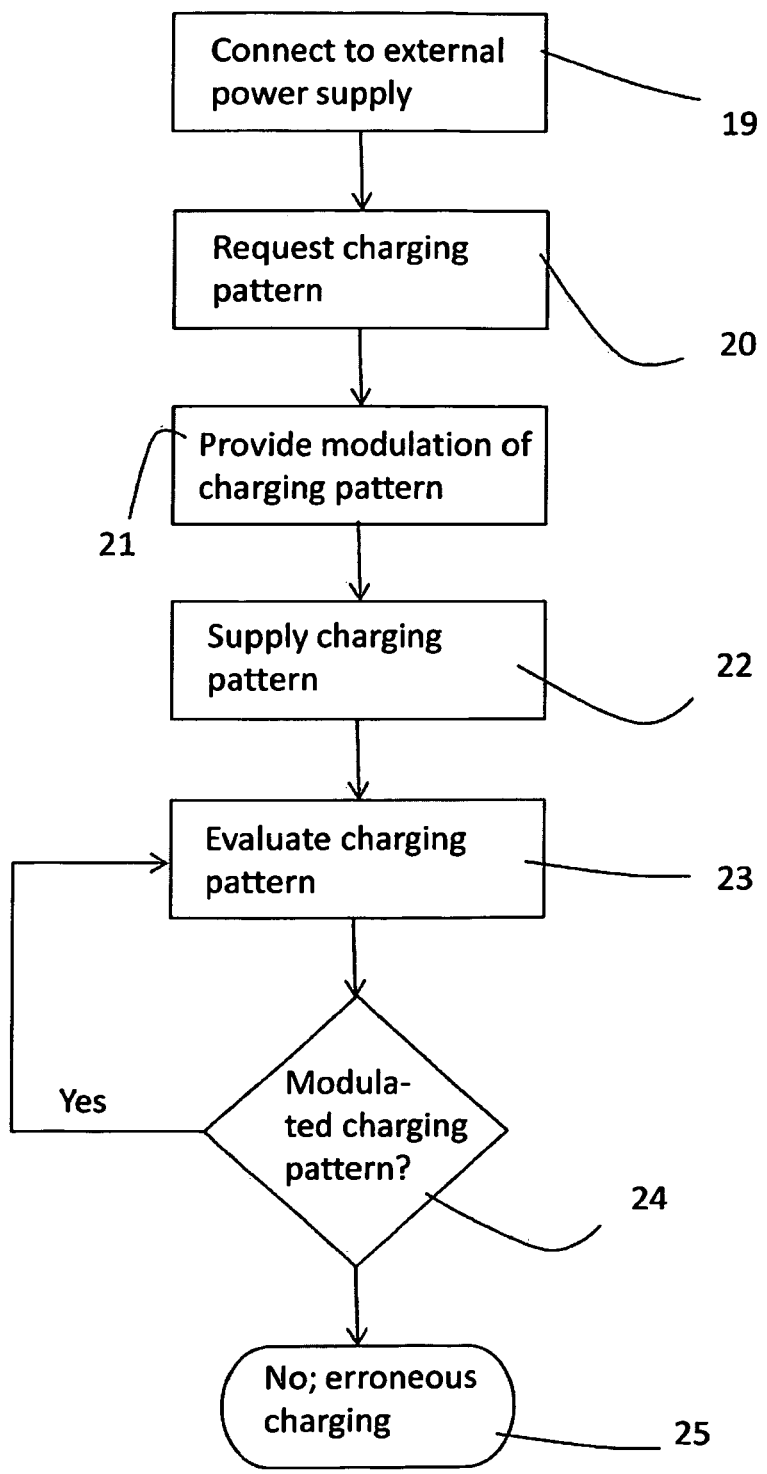
FIG. 3 is a simplified flow chart describing the principles of the invention.

When the connector elements 9, 10 are electrically connected to each other, the hybrid control unit 13 sends information to the charger control unit 17 corresponding to a request to supply charging in the form of a predetermined charging pattern (step 20 in FIG. 3). As explained above, such a charging pattern can for example be in the form of a "quick charge", i.e. involving a high charging current during a relatively short time period, or a "standard charge", i.e. involving a relatively low charging current during a relatively long time period.

The charging pattern chosen depends on several factors, such as the available time for charging, the actual state of charge of the energy storage system 7 and the available power from the external power supply 11.

Such information with a request for a charging pattern is transmitted on the information link 18. According to the embodiment, the information link 18 is at least partly wireless. Suitably, it constitutes a wireless connection at least from the bus 1 to the external power supply 11. In most applications, it can be expected that the bus 1 and the external power supply 11 are located within a close distance from each other, typically 5-20 meters. For this reason, the wireless connection can be obtained by means of a short-range radio connection link and may also be, for example, a Bluetooth or Zigbee communication link.

Before the actual charging of the energy storage system 7 is initiated by the external power source 11, a certain predetermined modulation of the requested charging pattern is initiated (step 21). This means that the hybrid control unit 13 is configured for adding some predetermined form of variation, adjustment or modulation upon the charging current to be supplied by the external power source 11. The fact that the modulation is "predetermined" means that the hybrid control unit 13 is arranged so as to determine whether the actual charging which subsequently is received by the vehicle 1 actually corresponds to the requested charging. Such a modulation can for example be implemented by:

i) temporarily changing the frequency, amplitude or wave shape, of the charging current which is to be supplied to the energy storage system through the charging pattern;

ii) superimposing or adding, at least temporarily, a signal component to the charging current having a predetermined amplitude or frequency, or a predetermined wave shape, which can be detected by a detector in the hybrid control unit 13;

iii) otherwise changing or modulating the charging pattern in a manner which is detectable by means of the hybrid control unit 13.

When the modulation of the charging pattern has been determined and implemented by the hybrid control 13 (step 21), more precisely in a modulation unit 13a as indicated schematically in FIG. 2, the actual pattern is initiated (step 22) by supplying said charging pattern by means of the external charging control unit 11 to the energy storage system 7.

It is an important feature of the invention that it comprises a step of evaluating (step 23 in FIG. 3) whether the charging pattern supplied to said energy storage system (7) comprises the predetermined modulation which previously had been imposed upon the charging current (in step 21). This evaluation is carried out (step 24) in an evaluation unit 13b which forms part of the hybrid control unit 13. If the evaluation results in an indication that the evaluated charging current does not comprise the modulation as implemented by means of the modulation unit 13a, this is interpreted as an erroneous charging (step 25).

On the other hand, if the evaluation results in an indication that the evaluated charging current in fact contains the modulation as implemented by means of the modulation unit 13a, this is interpreted as a correct charging. This means that the process returns to the step of evaluating the charging pattern (step 23).

It should be mentioned that in some applications, so-called pre-charging of the energy storage system 7 is carried out. This is a method, which is previously known as such, of limiting the current flowing from the external power supply 11 to the capacitive input of the energy storage system 7 during power up. According to the embodiment shown in the drawings, such a pre-charging is suitably carried out before the actual main charging according to the predetermined charging pattern is initiated.

In summary, the invention is based on the principles that it provides a predetermined modulation of a requested charging pattern, it evaluates whether the charging pattern supplied to the energy storage system 7 comprises said predetermined modulation; and, if this is not the case, it indicates that the charging of said energy storage system 7 is erroneous.

According to a particular embodiment of the invention, the error detection may comprise a measurement of the charging current and charging voltage at the charger control unit 17 with a corresponding measurement of the charging current and charging voltage at the disconnector unit 15. If the charging current or charging voltage should deviate between these two positions, it could be a sign of a build-up of a resistance within any, or both, of the connector elements 9, 10. This could be an indication of an error in the charging process.

In the event that the charging of the energy storage system 7 is not correct, the hybrid control unit 13 is according to the embodiment configured to initiate an alarm signal. Such a signal can be in a form which can be perceived for example by the driver of the vehicle 1. The driver may then manually switch off the charging by turning a switch or similar (not shown in the drawings). Alternatively, the vehicle control unit 8 may be arranged so that, in case of an erroneous charging, the disconnector unit 15 acts so as to disconnect the connector elements 9, 10 from each other in an automatic manner. By actually disconnecting the energy storage system 7 from the external power supply 11 in the event that said charging is erroneous, a very high level of safety is provided by means of the invention.

The invention is not limited to the embodiments described above, but can be varied within the scope of the subsequent claims.

For example, the invention can be used for any type of vehicle having a chargeable energy storage system which is configured for operating an electric machine and in which there is a desire to monitor a charging procedure.

For example, the invention can be used for a hybrid vehicle, such as a plug-in hybrid vehicle, or a full electric vehicle which is operated by means of an electric machine only. The invention can be used with different types of charging systems, both grid-based recharging and also charging arrangements based on external power supplies such as described above with reference to the embodiment described.

Furthermore, the invention can be used with different types of energy storage systems, different types of battery units and control devices etc. Also, different types of electrically conductive or inductive connector elements can be used in connection with the invention, in order to connect an external power supply to the energy storage system.

The invention claimed is:

1. A method for error detection during charging of an energy storage system in a vehicle, the vehicle comprising an electric machine which is arranged for propulsion of the vehicle, the method comprising:
   requesting a charging pattern from an external power supply, by means of a vehicle control unit, upon connection of the energy storage system to the external power supply;
   supplying the charging pattern to the energy storage system by means of an external charging unit forming part of the external power supply;
   providing a predetermined modulation of the requested charging pattern;
   evaluating whether the charging pattern supplied to the energy storage system comprises the predetermined modulation; and,
   indicating that the charging of the energy storage system is erroneous when the charging pattern does not comprise the predetermined modulation.

2. The method according to claim 1, further comprising providing the modulation in the form of a predetermined, temporary change of frequency or amplitude of a charging current which is supplied through the charging pattern.

3. The method according to claim 1, further comprising providing the modulation in the form of an added signal component which is temporarily superimposed to a charging current which is supplied through the charging pattern.

4. The method according to claim 1, further comprising providing an alarm signal in the event that the charging is erroneous.

5. The method according to claim 1, further comprising disconnecting the energy storage system from the external power supply in the event that the charging is erroneous.

6. The method according to claim 1, further comprising requesting the charging pattern via a wireless connection between a hybrid control unit of the vehicle control unit and the external charger control unit.

7. The method according to claim 1, further comprising evaluating whether the charging pattern comprises the predetermined modulation by means of a current or voltage measurement in the vehicle control unit.

8. The method according to claim 7, further comprising providing a current or voltage measurement related to the charging pattern in the external power supply, and comparing with a corresponding current or voltage measurement in the vehicle control unit.

9. An arrangement for error detection during charging of an energy storage system in a vehicle with an electric machine arranged for propulsion of the vehicle, the arrangement comprising:
   a vehicle control unit arranged for requesting a charging pattern from an external power supply upon connection of the energy storage to the external power supply;
   the external power supply comprising an external charging control unit arranged for supplying the charging pattern to the energy storage system; and
   a hybrid unit of the vehicle control unit comprising
      a modulation unit for applying a predetermined modulation of the requested charging pattern and
      an evaluation unit for
         determining whether the charging pattern supplied to the energy storage system comprises the predetermined modulation; and,
         indicating that the charging of the energy storage system is erroneous when the charging pattern does not comprise the predetermined modulation.

10. The arrangement according to claim 9, wherein the modulation unit is configured for providing the modulation in the form of a predetermined, temporary change of frequency or amplitude of a charging current which is supplied by the charging pattern.

11. The arrangement according to claim 9, wherein the modulation unit is configured for providing the modulation in the form of an added signal component which is temporarily superimposed to a charging current which is supplied by the charging pattern.

12. The arrangement according to claim 9, wherein the evaluation unit is configured for providing an alarm signal in the event that the charging is deemed to be erroneous.

13. The arrangement according to claim 9, wherein the vehicle control unit is configured for disconnecting the energy storage system from the external power supply in the event that the charging is deemed to be erroneous.

14. The arrangement according to claim 9, further comprising a communication link between the vehicle control unit and the external charger control unit.

15. The arrangement according to claim 14, wherein the communication link is wireless.

16. The arrangement according to claim 9, further comprising inductive or conductive connector elements between the energy storage system and the external power supply.

17. The arrangement according to claim 9, wherein the energy storage system comprises a rechargeable battery unit.

18. The arrangement according to claim 9, wherein the evaluation unit is configured for evaluating whether the charging pattern comprises the predetermined modulation by means of a current or voltage measurement.

19. The arrangement according to claim 18, wherein the external power supply is configured for providing a current and voltage measurement related to the charging pattern, and comparing it with a corresponding current or voltage measurement in the evaluation unit.

20. A vehicle of a plug-in hybrid electric vehicle type, comprising:
   an electric machine arranged for propulsion of the vehicle;
   an energy storage system in the vehicle;
   an arrangement for error detection during charging of the energy storage system in the vehicle, the arrangement comprising
      a vehicle control unit arranged for requesting a charging pattern from an external power supply upon connection of the energy storage system to the external power supply;
      the external power supply comprising an external charging control unit arranged for supplying the charging pattern to the energy storage system; and
      the vehicle control unit comprising
         a modulation unit for applying a predetermined modulation of the requested charging pattern and
         an evaluation unit for
            determining whether the charging pattern supplied to the energy storage system comprises the predetermined modulation and,
            indicating that the charging of the energy storage system is erroneous when the charging pattern does not comprise the predetermined modulation.

* * * * *